United States Patent Office 3,647,904

Patented Mar. 7, 1972

3,647,904

PROCESS FOR THE PREPARATION OF UNSATURATED POLYESTER RESIN

Masaya Imai, Suita-shi, Masuji Izubayashi, Osaka, Keiichi Takiyama and Mitsuo Hirai, Suita-shi, and Masao Nikki, Ibaraki-shi, Japan, assignors to Nippon Shokubai Kagaku Kogyo Co., Ltd., Osaka, Japan No Drawing. Filed Sept. 4, 1969, Ser. No. 885,415
Claims priority, application Japan, Sept. 9, 1968, 43/64,488; Jan. 22, 1969, 44/4,090
Int. Cl. C08g *17/007, 17/12, 39/06*
U.S. Cl. 260—861 4 Claims

ABSTRACT OF THE DISCLOSURE

A process for the preparation of an unsaturated polyester resin, which comprises adding hydrogen peroxide to a mixture of an unsaturated organic compound containing an unsaturated radical which can be epoxidated with an organic peracid, with a polycarboxylic anhydride, at temperatures ranging from 10 to 120° C., to perform the epoxidation reaction, said unsaturated organic compound being selected from the group consisting of hydrocarbons, halogenated hydrocarbons, carboxylic acids, carboxylates and alkyl ethers containing the unsaturated radical; heating the reaction mixture to 150–250° C. in an inert gaseous current to effect the polyesterification thereof; and thereafter mixing the resulting unsaturated polyester with a monomer which is copolymerizable with the polyester.

This invention relates to a process for the preparation of unsaturated polyester resins. More particularly, the invention relates to a process for the preparation of unsaturated polyester resins which comprises adding hydrogen peroxide to a mixture of a hydrocarbon, halogenated hydrocarbon, carboxylic acid, carboxylate, or an alkyl ether, all of which contain an unsaturated radical epoxidatable with an organic peracid, with a polycarboxylic anhydride, at temperatures ranging from 10 to 120° C. under atmospheric or elevated pressure, to effect the epoxidation; heating the reaction product at 150–250° C. in an inert gaseous current, to effect the polyesterification thereof; and thereafter mixing the resulting unsaturated polyester with a monomer which is copolymerizable with the polyester.

Conventionally, unsaturated polyester resins have been prepared by the steps of reacting a polyhydric alcohol or a derivative thereof, with an unsaturated polycarboxylic acid of a derivative thereof or, if necessary, unsaturated polycarboxylic acid or a derivative thereof partly substituted by a saturated polycarboxylic acid, and mixing the resulting unsaturated polyester with a monomer which is copolymerizable therewith. It is also well known to replace the polyhydric alcohol with the corresponding epoxy compound.

Briefly stated, this invention achieves the following improvements over the above-described conventional process, by the use of compounds containing unsaturated radicals which are epoxidizable (or hydroxylatable) with an organic peracid (which may be hereinafter referred to as the unsaturated organic compounds A) and hydrogen peroxide, instead of the polyhydric alcohol or the corersponding epoxy compound.

According to the subject process, the procedure of preparation of the unsaturated polyester can be simplified. In the conventional method of unsaturated polyester resin preparation, normally the starting polyhydric alcohol or the corresponding epoxy compound is obtained through cumbersome series of steps, such as epoxidation of an unsaturated hydrocarbon, hydration, isolation and purification. The specified compound containing an unsaturated radical which can be epoxidized or hydroxylated with an organic peracid (unsaturated organic compound A) can immediately participiate in the polyesterifying reaction after its epoxidation according to the present invention. Thus the setps of isolation and purification as a polyhydric alcohol or the corresponding epoxy compound are entirely unnecessary in the subject process.

Second, the epoxidation can be performed advantageously in accordance with the present invention. Conventionally, the chlorohydrin process is the most widely practiced means of epoxidation, but such process consumes a large amount of chlorine, and the procedures required are complex. Thus it is subject to the obvious limitation of high cost. As prospective alternative epoxidation means, the use of organic hydroperoxide, hydrogen peroxide and carboxylic acid or anhydride thereof, or peracetic acid, etc. have been proposed, but in all cases isolation and reuse of the alcohol or carboxylic acid remaining after the epoxidation require expensive procedures, or the recovered compound has only limtied usage. in both instances adding to the production cost of the unsaturated polyester resin.

According to the present invention, the carboxylic acid remaining after the epoxidation participitates in the subsequent polyesterifying reaction to become a component of the unsaturated polyester resin. Therefore it is entirely unnecessary to isolate it as carboxylic acid, and thus the loss thereof is nil.

Third, it is possible to produce with less cost unsaturated polyester resins rich in versatility in accordance with the present invention. In known processes, the number of polyhydric alcohols or the corresponding epoxy compounds usable as the starting material is severely limited, because the types of polyhydric alcohols or the corresponding epoxy compounds which can be industrially produced with low cost are only few. In fact, not more than several polyhydric alcohols are presently used, such as ethylene glycol, propylene glycol, and neopentyl glycol. In contrast, according to the present invention very many types of unsaturated organic compounds can be freely used for various purposes, because of the reasons described in the above. Thus it is now possible to make many unsaturated polyester resins which heretofore could not be industrially produced, with surprisingly low cost.

A preferred embodiment of the invention is as follows.

Into a mixture of the unsaturated organic compound A with at least 1 equivalent per 1 unsaturated equivalent of said compound A of a polycarboxylic anhydride (which may be optionally dissolved in an inert solvent such as toluene, xylene, petroleum solvents, dioxane, acetone, chloroform, ether, and water), at least 1 equivalent, preferably 1.1–10 equivalents, per 1 unsaturated equivalent of the compound A of hydrogen peroxide in the form of an aqueous solution or organic solvent solution is dropped under stirring, at temperatures ranging frm 10–120° C., preferably 30–80° C., at atmospheric or elevated pressure. In the meantime, the reaction system is maintained at the predetermined temperature by heating or cooling. Maintaining the system at such temperature for additional 2–8 hours after dropping of the hydrogen peroxide solution is completed, the epoxidation (1st stage reaction) is performed. The reaction is preferably effected at an elevated pressure not higher than 15 atmospheres. After reducing the reaction pressure to atmospheric, the system is gradually heated to approximately 150° C. so that the water or organic solvent in the hydrogen peroxide solution, water formed from hydrogen peroxide, organic solvent, if used in the reaction, and unreacted hydrogen peroxide, are removed. If necessary, polyhdric alcohol and/or unsaturated and/or saturated polycarboxylic acid and/or anhydride thereof is added to the remaining system, and the system is heated at 150–250° C. in an inert gaseous current, to effect a polyesterifying reaction (2nd stage reaction) until a predetermined acid value is obtained. In the first and second stage reactions, favorable result is often obtained by adding a partially esterified product obtained by reacting alcohol with carboxylic acid or anhydride thereof and which contains at least one unreacted hydroxyl radical (but not necessarily unreacted carboxyl radical) within one molecule, to the reaction mixture. Presence of such a partially esterified product assists more intimate contact of the reactants and consequently, smoother progress of the reaction. The unsaturated polyester which is obtained is dissolved in a bridging monomer which is copolymerizable with said polyester, to provide an unsaturated polyester resin.

Examples of hydrocarbons, halogenated hydrocarbons, carboxylic acids, carboxylates and alkylethers containing an unsaturated radical which can be epoxidated or hydroxylated with an organic peracid, the starting materials of the subject process as already mentioned, include: aliphatic olefins and diolefins such as ethylene, propylene, butene - 1, butene - 2, isobutene, butadiene, pentene-1, pentene-2, isopentene, isoprene, hexene-1, hexene-2, hexene-3, isohexene, hexadiene, isoheptene, isooctene, propylene trimer, and propylene tetramer; olefins and diolefins obtained by pyrolysis or dehydrogenation of hydrocarbon and dehydrohalogenation of halogenated paraffins; olefins obtained by polymerizing lower monoolefins such as ethylene, propylene, etc. in the presence of a polymerization catalyst such as Ziegler catalyst; aromatic olefins such as styrene, α-methylstyrene, vinyltoluene, etc; polymers of diolefins such as polybutadiene; unsaturated polymers which are the copolymers of a diolefin with a monoolefin such as styrene, and which contain at least one carbon-to-carbon double bond in the molecule; petroleum resins; alicyclic unsaturated hydrocarbons such as cyclopentene, cyclohexene, cycloheptene, cyclooctene, cyclopentadiene, cyclohexadiene, cyclooctadiene, dicyclopentadiene, and cyclododecatriene; halogenated hydrocarbons such as trichloroethylene, tetrachloroethylene, tribromoethylene, tetrafluoroethylene, chlorotrifluoroethylene, hexachloropropylene, hexafluoropropylene, allyl chloride, allyl bromide, allyl fluoride, and 2,5-dichlorostyrene; carboxylic acids such as 3,6-endomethylenetetrahydrophthalic acid, and tetrahydrophthalic acid, esters of those carboxylic acids; and alkyl ethers such as the adduct of divinyl glycol with ethylene oxide. Among the foregoing, a distillate fraction containing butene and butene, which is obtained by pyrolysis or dehydrogenation of hydrocarbon can be utilized with economical advantage, as a substitute for pure butene.

Such distillate fraction can be obtained in various ways. For example, in steam cracking of naphtha to separate ethylene, propylene, etc., a distillate fraction of four carbons (BB distillate fraction) is simultaneously formed. The fraction useful for the present invention can be obtained by extracting butadiene from the BB distillate fraction (the residue being normally referred to as spent fraction of distillate), or by further removing isobutene therefrom. Other fractions can be obtained from steam cracking of hydrocarbon distillate fractions other than naphtha, such as light oil, heavy oil, crude oil, etc. through similar procedures to the above. They can be also obtained through thermal cracking and catalytic cracking of hydrocarbons in petroleum refining. Furthermore, dehydration of normal butane also provides such distillate fraction. Thus, since the distillate fractions containing butane and butene are latently present in large quantities in petroleum refining and petrochemical industries, they are extremely cheap. According to the present invention, it is perfectly permissible to use butene as mixed with butane. That is, among the butanes and butenes present in the distillate fractions, the butenes selectively react with polycarboxylic anhydrides and hydrogen peroxide at high yield, while butanes do not participate in the reaction. The butanes can be separately recovered after the reaction, to be used as fuel. Thus it is possible to produce very cheap polyester.

Obviously, greater butene concentration in the distillate fractions is preferred, since the compound useful in the subject process is butene, not butane. Therefore, when the butene concentration is low, in certain cases it may be preferable to increase the concentration by such means as extractive distillation. The fractions occasionally contain minor quantities of dienes or traces of distillate fractions of three and five carbons, without adversely affecting the effect of this invention.

Suitable polycarboxylic anhydrides to be used in the present invention includes the following: acid anhydrides such as phthalic, succinic, glutaric, maleic, citraconic, chlorinated maleic, tetrahydrophthalic, hexahydrophthalic, tetrachlorophthalic, hexachlorophthalic, tetrabromophthalic, hexabromophthalic, 3,6 - endomethylenetetrahydrophthalic, 3,6-endodichloromethylenetetrachlorophthalic, trimellitic, and pyromellitic anhydrides; Diels-Alder adducts of various dienes, such as terpenes, cyclopentadiene, cyclohexadiene, hexachlorocyclopentadiene, etc., with maleic anhydride; and Diels-Alder adducts of α-olefins with maleic anhydride. It is necessary that at least one equivalent per unsaturated equivalent of the unsaturated organic compound A of such polycarboxylic anhydride should be used. If it is less than an equivalent, epoxidation of the unsaturated organic compound A is only incompletely performed, and consequently an additional step of removing unreacted unsaturated organic compound A is required after the reaction.

The polycarboxylic acid may be saturated or unsaturated. If a saturated polycarboxylic anhydride is used, it is necessary to add an unsaturated polycarboxylic acid or anhydride thereof to the subsequent polyesterifying reaction system, in order to produce an unsaturated polyester. It is normally required that the content of unsaturated polycarboxylic acid in the total polycarboxylic acid be at least 10 mol percent.

As the polycarboxylic acid or anhydride thereof to be added to the polyesterifying reaction when required, the following acids may be named, besides the polycarboxylic anhydrides useful for the epoxidation of unsaturated organic compound A: succinic, glutaric, adipic, sebacic, azelaic, thioglycolic, maleic, fumaric, mesaconic, citraconic, itaconic, chlorinated maleic, phthalic, isophthalic, terephthalic, tetrahydrophthalic, hexahydrophthalic, tetrachlorophthalic, hexachlorophthalic, tetrabromophthalic, hexabromophthalic, 3,6-endomethylenetetrahydrophthalic and 3,6-endodichloromethylenetetrachlorophthalic acids, etc.

As the polyhydric alcohol which is added to the polyesterifying reaction system when necessary, the following may be named by way of examples: ethylene glycol, diethylene glycol, triethylene glycol, propylene glycol, dipropylene glycol, 1,3-butylene glycol, 2,3-butylene glycol, 1,3-butenediol, pentanediols, hexanediols, hydride of bis-phenol A, alkylene oxide adduct of bis-phenol A, and neopentyl glycol.

Hydrogen peroxide is used in the form of an aqueous solution or an organic solvent solution, of 3–60 wt. percent, preferably 30–60 wt. percent in concentration. The hydrogen peroxide solution is dropped into the first stage reaction system, in at least an equivalent amount, preferably approximately 1.1–10 equivalents, per one unsaturated equivalent of the unsaturated organic compound containing at least one carbon-to-carbon double bond in one molecule.

In the subject process, a partially esterified product containing at least one unreacted hydroxyl group in its one molecule may be present in the reaction system for epoxidizing the mixture of the unsaturated organic compound A and polycarboxylic anhydride with hydrogen peroxide, in order to assist the better mutual contact of the reactants. Such partially esterified products can be formed from such carboxylic acid components, besides the already named polycarboxylic acid, for example, diglycollic acid, dimers of fatty acids of semi-drying oil and drying oil such as soybean oil, linseed oil, etc., fatty acids of non-drying, semi-drying, and drying oils, benzoic acid, para tertiary-butylbenzoic acid, and abietic acid, and from such alcohol components as, for example, methanol, ethanol, normal propanol, isopropanol, normal butanol, isobutanol, tertiary butanol, cyclohexanol, heptanol, octanol, tridecanol, secondary alcohols obtained by oxidation of normal paraffins of 6–20 carbons, primary alcohols, of 10–20 carbons obtained by reduction of fat and oil, ethylene glycol, diethylene glycol, triethylene glycol, propylene glycol, dipropylene glycol, 1,2-butanediol, 1,3-butanediol, 2,3-butanediol, 1,4-butanediol, glycerine, butanetriol, trimethylolpropane, trimethylolethane, pentanediol, hexanediol, hydride of bis-phenol A, alkylene oxide adduct of bis-phenol A, neopentyl glycol, pentaerythyritol, dipentaerythritol, diglycerine, triglycerine, and sorbitol. The ratio of the carboxylic acid component and alcohol component to be reacted is such that at least one hydroxyl group or carboxyl group in each component can be reacted.

This partially esterified product may be initially added to the mixture of unsaturated organic compound A and polycarboxylic anhydride. It may be dissolved in the hydrogen peroxide solution and together dropped into the reaction system, or it may be added to the system separately from, but simultaneously with, the hydrogen peroxide solution. The preferred practice is to dissolve it in the hydrogen peroxide solution prior to its dropwise addition to the reaction system. The suitable amount to be added is approximately 1–40 wt. percent, preferably 3–20%, to the total weight of unsaturated organic compound A and polycarboxylic anhydride. This partially esterified product becomes a component of the unsaturated polyester in the subsequent polyesterifying reaction.

The polyesterifying reaction is recommendably performed at the mol ratio of polyhydric alcohol or epoxy compound corresponding thereto to the polycarboxylic acid or anhydride thereof, of at least 1, preferably 1 to 1.2. As already mentioned, however, since at least one equivalent per one unsaturated equivalent of compound A of polycarboxylic anhydride and hydrogen peroxide are used in the epoxidation of unsaturated organic compound A with hydrogen peroxide, excessive acid is present in the reaction mixture. Consequently, in order to bring about the mol ratio of the acid to alcohol within the above-specified range, it is necessary to add an amount of polyhydric alcohol. If more unsaturated and/or saturated polycarboxylic acid and/or anhydride thereof is added to the polyesterifying reaction system as the occasion demands, the corresponding amount of polyhydric alcohol should also be added.

The unsaturated polyester obtained is dissolved in a bridging monomer which is copolymerizable with the polyester, to provide the unsaturated polyester resin of the present invention. As such copolymerizable monomers, the following may be named by way of example: vinyl compounds such as styrene, vinyltoluene, α-methylstyrene, chlorostyrene, divinylbenzene, vinyl acetate, and acrylonitrile; methacrylates such as methyl methacrylate, and ethyl methacrylate; acrylates such as methyl acrylate, ethyl acrylate and butyl acrylate; and allyl-containing compounds such as diallyl phthalate, diallyl isophthalate, and triallyl cyanurate. Such a monomer is suitably used in an amount of 85–15 parts by weight to 15–85 parts by weight of the unsaturated polyester.

The unsaturated polyester resin obtained is stabilized and cured with such additives as known stabilizers, curing catalysts, and promotors.

Hereinafter the process of this invention will be explained in further detail, with reference to the working examples, in which parts are by weight unless otherwise specified.

EXAMPLE 1

A four-necked flask provided with a stirrer, thermometer, reflux condenser and inert gas inlet pipe was charged with 104 parts (1 mol) of styrene and 222 parts (1.5 mol) of phthalic anhydride. The system was heated to 60° C. with stirring, and into which 112 parts (1.65 mol) of 50% aqueous hydrogen peroxide solution were dropped over a period of an hour. In the meantime and for 7 hours after completion of the dropping, the system was constantly maintained at 60° C. Whereupon the remaining amount of hydrogen peroxide became constant. The conversion of styrene at that time was 98.5%.

Water and unreacted hydrogen peroxide were removed from the reaction mixture by gradually heating the latter to 150° C., and thereafter 147 parts (1.5 mol) of maleic anhydride and 167 parts (2.2 mol) of propylene glycol were added to the system. The system was heated to 200° C. in gaseous nitrogen current, and reacted until the acid value became 40, followed by cooling to 100° C. To 70 parts of the unsaturated polyester obtained, 0.01 part of hydroquinone and 30 parts of styrene were added, to form an unsaturated polyester resin.

The viscosity of this resin was measured with Gardner bubble viscometer, with the result of $Z_1$–$Z_2$. A composition obtained by adding 1 part of dimethyl phthalate solution containing 55% of methyl ethyl ketone peroxide and 0.2 part of cobalt octenoate (metal component, 8%) to 100 parts of the above resin gelled by 19 minutes at 25° C.

EXAMPLE 2

A three-necked flask equipped with a stirrer, thermometer, and reflux condenser was charged with 62 parts (1 mol) of ethylene glycol and 98 parts (1 mol) of maleic anhydride. The system was heated to 55° C. with stirring, and reacted for 4 hours. The acid value of the reaction mixture became 350, which coincided with the theoretical value of semi-ester.

Separately, the reactor similar to that employed in Example 1 was charged with 91 parts (0.5 mol) of α-olefin of 12–14 carbons and 88.8 parts (0.6 mol) of phthalic anhydride. The system was heated to 50° C. with stirring, and into which a liquid mixture consisting of 68.0 parts (0.6 mol) of 50% aqueous hydrogen peroxide solution and 16 parts (0.1 mol) of the first prepared partially esterified product of ethylene glycol and maleic anhydride was dropped over 40 minutes. After completion of the dropping, the reaction mixture was still maintained at 50° C. for additional 4 hours, whereupon the remaining amount of hydrogen peroxide became constant. The conversion of α-olefin at that time was 98.8%.

This reaction product was gradually heated to 150° C. to remove water and unreacted hydrogen peroxide. To the remaining mixture 98 parts (1.0 mol) of maleic anhydride and 91.3 parts (1.2 mol) of propylene glycol were added, and heated to 200° C. in gaseous nitrogen current. The reaction was continued until the acid value of the product became 35, followed by cooling to 100° C. To 70 parts of the resulting unsaturated polyester, 0.01 part of hydroquinone and 30 parts of styrene were added, to provide an unsaturated polyester resin.

The viscosity of this resin was Y–Z when measured with Gardner bubble viscometer. The composition obtained by adding 1 part of dimethyl phthalate solution containing 55% of methyl ethyl ketone peroxide and 0.2 part of cobalt octenoate (metal component, 8%) of 100 parts of the above resin gelled after 22 minutes at 25° C.

EXAMPLE 3

A reactor similar to that employed in Example 1 was charged with 72 parts (0.6 mol) of α-olefine of 6–11 carbons and 103.7 parts (0.7 mol) of phthalic anhydride. The system was heated to 40° C., and into which a liquid mixture consisting of 68 parts (1.0 mol) of 50% aqueous hydrogen peroxide solution and 16 parts (0.1 mol) of the partially esterified product formed of ethylene glycol and maleic anhydride as in Example 2 was dropped over 40 minutes with stirring. The reaction mixture was maintained at 40° C. for 4 hours after completion of the dropping, until the remaining amount of hydrogen peroxide became constant. The conversion of α-olefin at that time was 98.0%.

Water and unreacted hydrogen peroxide were removed from the reaction product as the latter was gradually heated to 150° C. Then 68.6 parts (0.7 mol) of maleic anhydride and 68.5 parts (0.9 mol) of propylene glycol were added to the remaining product, and heated to 200° C. in gaseous nitrogen current. The reaction was continued until the acid value of the product became 35, and the system was cooled to 100° C. To 70 parts of the unsaturated polyester obtained, 0.01 part of hydroquinone and 30 parts of styrene were added, to form an unsaturated polyester resin.

The viscosity of this resin as measured with Gardner bubble viscometer was $Z–Z_1$. The composition obtained by adding 1 part of dimethyl phthalate solution containing 55% of methyl ethyl ketone peroxide and 0.2 part of cobalt octenoate (metal component, 8%) to 100 parts of this resin gelled by 23 minutes at 25° C.

EXAMPLE 4

A reactor similar to that employed in Example 1 was charged with 144 parts (1.2 mols) of α-olefin of 6–11 carbons, 103.7 parts (0.7 mol) of phthalic anhydride, and 68.6 parts (0.7 mol) of maleic anhydride. The system was heated to 40° C., and into which a liquid mixture consisting of 220 parts (2.0 mols) of 30% aqueous hydrogen peroxide solution and 32 parts (0.2 mol) of the partially esterified product of ethylene glycol and maleic anhydride prepared in Example 2 was dropped over 60 minutes with stirring. When the reaction mixture was further maintained at 40° C. for 6 hours after completion of the dropping, the remaining amount of hydrogen peroxide became constant. The conversion of α-olefin at that time was 98.7%.

Water and unreacted hydrogen peroxide were removed from the reaction product as the latter was gradually heated to 150° C., and then 30.4 parts (0.4 mol) of propylene glycol were added to the remaining product, followed by heating to 200° C. in gaseous nitrogen current. The reaction was continued until the acid value of the product reached 28, and the system was cooled to 100° C. Sixty-five (65) parts of the resulting unsaturated polyester were mixed with 0.01 part of hydroquinone and 35 parts of styrene, to form an unsaturated polyester resin.

The viscosity of this resin as measured with Gardner bubble viscometer was W–X. Gelling time of this resin as measured under identical conditions as described in Example 3 was 20 minutes.

EXAMPLE 5

A pressure reactor of stainless steel (SUS 32) provided with a stirrer thermometer, hydrogen peroxide inlet pipe workable under elevated pressure, reflux condenser and inert gas inlet pipe was used in this example. The reflux condenser and inert gas inlet pipe were closed, and the reactor was charged with 148 parts (1 mol) of phthalic anhydride and 33.6 parts (0.8 mol) of liquid propylene. The system was heated to 40° C., and into which 136 parts (1.2 mols) of 30% aqueous hydrogen peroxide solution was fed under an elevated pressure for an hour, with stirring. In the meantime, the temperature was maintained at 40° C., and the pressure became 16 kg./cm.$^2$. After the hydrogen peroxide supply was completed, the system was maintained at 40° C. for an additional 4 hours, while the pressure dropped almost to the atmospheric level.

The reflux condenser was opened, and the content of the reactor was gradually heated to 150° C. whereby removing water and unreacted hydrogen peroxide from the system. Then 98 parts (1 mol) of maleic anhydride and 86.8 parts (1.4 mols) of ethylene glycol were added to the remaining reaction product, followed by heating at 200° C. The reaction was continued until the acid value of the product reached 35, and the system was cooled to 100° C. To 65 parts of the resulting unsaturated polyester, 0.01 part of hydroquinone and 35 parts of styrene were added, to form an unsaturated polyester resin.

The viscosity of this resin as measured with Gardner bubble viscometer was V–W, and its gelling time measured under identical conditions as in Example 3 was 20 minutes.

EXAMPLE 6

The same reactor employed in Example 5 was charged with 148 parts (1 mol) of phthalic anhydride and 44.8 parts (0.8 mol) of liquid isobutylene, while the reflux condenser and inert gas inlet pipe were kept closed. The system was heated to 40° C., and into which 13.6 parts (1.2 mols) of 30% aqueous hydrogen peroxide solution were fed with an elevated pressure over an hour, under stirring. The temperature was maintained at 40° C. throughout the hydrogen peroxide supply, and the final pressure reached 4.5 kg./cm.$^2$. When the reaction system was maintained at 40° C. for 5 hours after completion of the hydrogen peroxide supply, the pressure dropped substantially to the atmospheric level.

The reflux condenser was opened, and the system was gradually heated to 150° C. to effect the removal of water and unreacted hydrogen peroxide. Then 98 parts (1.0 mol) of maleic anhydride and 107 parts (1.4 mols) of propylene glycol were added to the system, and reacted at 200° C. in gaseous nitrogen current until the acid value reached 30. The system was subsequently cooled to 100° C. To 65 parts of the unsaturated poyester obtained, 0.01 part of hydroquinone and 35 parts of styrene were added, to form an unsaturated polyester resin.

The viscosity of the resin as measured with Gardner bubble viscometer was V–W, and its gelling time measured under identical conditions as in Example 3 was 19 minutes.

EXAMPLE 7

The same reactor employed in Example 1 was charged with 82.1 parts (1 mol) of cyclohexene and 315 parts (1.1 mol) of tetrachlorophthalic anhydride. The system was heated to 60° C., and into which 82 parts (1.2 mols) of 50% aqueous hydrogen peroxide solution was dropped over 40 minutes, while the reaction temperature was always maintained at 60° C., with stirring. After the dropping was completed, the system was still maintained at 60° C. for 6 hours, whereupon the remaining amount of hydrogen peroxide became constant. The conversion of cyclohexene at that time was 97.0%

This reaction product was gradually heated further to 150° C., to effect elimination of water and unreacted hydrogen peroxide from the system. Then 98 parts (1.0 mol) of maleic anhydride and 91 parts (1.2 mols) of propylene glycol were added to the remaining product, and reacted at 200° C. in gaseous nitrogen current until the acid value reached 35. The reaction system was then cooled to 100° C. To 65 parts of the unsaturated polyester obtained, 0.01 part of hydroquinone and 35 parts of styrene were added to form an unsaturated polyester resin.

The viscosity of the resin as measured with Gardner bubble viscometer was W–X, and its gelling time measured under identical conditions as employed in Example 1 was 25 minutes.

EXAMPLE 8

The same reactor as employed in Example 1 was charged with 166 parts (1 mol) of tetrachloroethylene and 315 parts (1.1 mols) of tetrachlorophthalic anhydride. The system was heated to 50° C. and into which 82 parts (1.2 mols) of 50% aqueous hydrogen peroxide solution dropped over 40 minutes, with stirring, while maintaining the reaction temperature always at 50° C. After completion of the dropping, the reaction mixture was maintained at 50° C. for 5 hours, until the remaining amount of hydrogen peroxide became constant. The conversion of tetrachloroethylene at that time was 95%.

The reaction product was further gradually heated to 150° C. to effect removal of water and unreacted hydrogen peroxide from the system. Then 78.4 parts (0.8 mol) of maleic anhydride and 83.7 parts (1.1 mols) of propylene glycol were added to the system, and reacted at 200° C. in gaseous nitrogen current until the acid value reached 45. The system was then cooled to 100° C. To 70 parts of the unsaturated polyester obtained, 0.01 part of hydroquinone and 30 parts of styrene were added, to form an unsaturated polyester resin.

The viscosity of this resin as measured with Gardner bubble viscometer was V–W, and its gelling time measured under identical conditions as employed in Example 1 was 26 minutes. This resin exhibited combustion resistance since it contained 31.7% of chlorine. For example, when 100 parts of this resin was cured after addition of 5 parts of antimony trioxide, 1 part of dimethyl phthalate solution containing 55% of methyl ethyl ketone peroxide, and 0.3 part of cobalt octenoate (metal component, 8%), the composition was noncombustible when subjected to the combustibility test described in JIS K 6911.

EXAMPLE 9

The same reactor as employed in Example 1 was charged with 198 parts (1 mol) of dimethyl tetrahydrophthalate and 163 parts (1.1 mols) of phthalic anhydride. The system was heated to 60° C., and into which 82 parts (1.2 mols) of 50% aqueous hydrogen peroxide solution was dropped over 40 minutes, with stirring, while maintaining the reaction temperature always at 60° C. The reaction mixture was maintained at 60° C. for 6 hours after completion of the dropping, until the remaining amount of hydrogen peroxide became constant. The conversion of dimethyl tetrahydrophthalate at that time was 96%.

This reaction product was further gradually heated to 150° C. to effect removal of water and unreacted hydrogen peroxide therefrom. Then 98 parts (1.0 mol) of maleic anhydride and 99 parts (1.3 mols) of propylene glycol were added to the system, and reacted at 200° C. in gaseous nitrogen current until the acid value reached 35. The system was then cooled to 100° C. To 65 parts of the unsaturated polyester obtained, 0.01 part of hydroquinone and 35 parts of styrene were added to form an unsaturated polyester resin.

The viscosity of the resin as measured with Gardner bubble viscometer was W–X, and its gelling time measured under identical conditions as employed in Example 1 was 20 minutes.

EXAMPLE 10

The same reactor as employed in Example 5 was charged with 118 parts (1.2 mols) of maleic anhydride and 42 parts (1 mol) of liquid propylene, while its reflux condenser and inert gas inlet pipe were kept closed. The system was heated to 40° C., and into which 159 parts (1.4 mols) of 30% aqueous hydrogen peroxide solution were fed over a period of an hour with an elevated pressure, under stirring, while maintaining the reaction temperature always at 40° C. The final pressure reached 16 kg./cm.². The system was still maintained at 40° C. for 5 hours after the hydrogen peroxide supply was completed, and by the end of 5th hour, the pressure dropped substantially to the atmospheric level.

The reflux condenser was opened, and the reaction mixture was gradually heated to 150° C. to effect removal of water and unreacted hydrogen peroxide therefrom. Then to the system 22.8 parts (0.3 mol) of propylene glycol were added and reacted at 200° C. in gaseous nitrogen current, until the acid value reached 35. Then the system was cooled to 100° C. To 65 parts of the resulting unsaturated polyester, 0.01 part of hydroquinone and 35 parts of styrene were added, to form an unsaturated polyester resin.

The viscosity of the resin as measured with Gardner bubble viscometer was V–W, and its gelling time measured under identical conditions as employed in Example 3 was 18 minutes.

EXAMPLE 11

The same reactor as employed in Example 5 was charged with 148 parts of phthalic anhydride and 98 parts of maleic anhydride, and the atmosphere inside the reactor was replaced by nitrogen gas. Then 149 parts of butane-butene fraction of distillate of the composition indicated in Table 1 below were fed into the reactor at an elevated pressure. This distillate fraction was obtained by removing butadiene and isobutene by extraction from the fraction of distillate of 4 carbons separated by steam cracking of naphtha.

TABLE 1

| | Mol percent |
|---|---|
| $C_3$ fraction of distillate | 0.3 |
| Isobutane | 5.8 |
| Isobutene | 0.9 |
| Normal butene-1 | 42.9 |
| Normal butane | 23.9 |
| Normal butene-2 | 25.5 |
| Butadiene | 0.7 |

The reaction mixture was heated to 60° C., and into which 238 parts of 31.2% concentration aqueous hydrogen peroxide solution were fed at a constant rate at an elevated pressure, over a period of approximately an hour with stirring. In the meantime, the reaction mixture was maintained at 60° C. by external heating or cooling. The pressure gauge at that time indicated 6 kg./cm.². The reaction system was continuously stirred for approximately 4 hours after the addition of hydrogen peroxide was completed, still at 60° C. Then the valve on the upper part of reflux condenser was opened to drop the pressure to the atmospheric level, and the system was heated to 100–105° C. to decompose the unreacted hydrogen peroxide.

Then the reaction mixture was gradually heated to 150° C. to effect the removal of water and unreacted hydrogen peroxide, and to the remaining system 21.3 parts of propylene glycol were added. The subsequent polyesterifying reaction was performed at 200° C. in gaseous nitrogen current, until the acid value reached 35. The reaction mixture was cooled to 100° C. To 65 parts of the resulting unsaturated polyester, 0.01 part of hydroquinone and 35 parts of styrene were added to form an unsaturated polyester resin.

The viscosity of the resin as measured with Gardner bubble viscometer was L–M. Also the gelling time of the composition obtained by adding 1 part of dimethyl phthalate solution containing 55% of methyl ethyl ketone peroxide and 0.2 part of cobalt octenoate (metal component, 8%) to 100 parts of said resin was approximately 15 minutes.

EXAMPLE 12

The same reactor as employed in Example 11 was charged with 98 parts of maleic anhydride, and the atmosphere in the reactor was substituted with nitrogen gas. To the maleic anhydride then 63 parts of butane-butene fraction of distillate of the composition indicated in Table 2 were added under an elevated pressure. The fraction employed was that obtained by removing butadiene by extraction from the $C_4$ distillate fraction separated upon steam cracking of naphtha.

TABLE 2

| | Mol percent |
|---|---|
| $C_3$ fraction of distillate | 0.2 |
| Isobutane | 3.4 |
| Isobutene | 40.8 |
| Normal butene-1 | 25.5 |
| Normal butane | 14.3 |
| Normal butene-2 | 15.0 |
| Butadiene | 0.8 |

This reaction mixture was heated to 55° C., and into which 119 parts of 31.2% aqueous hydrogen peroxide solution were added at a constant rate for an hour, at an elevated pressure and with stirring. In the meantime, the reaction temperature was maintained at 55° C. by external heating or cooling. The pressure gauge at that time indicated approximately 6 kg./cm.². After completion of the hydrogen peroxide addition, the temperature was gradually raised to 60° C., and the stirring was continued for subsequent 2 hours at said temperature. Then the valve on the upper part of reflux condenser was opened to drop the pressure to the atmospheric level, and the temperature was raised to 100–105° C. to decompose the unreacted hydrogen peroxide. The product was referred to as the reaction mixture I.

Separately, the identical reactor with the above was charged with 21.3 parts of propylene glycol and 148 parts of phthalic anhydride, and after substitution of the inside atmosphere with nitrogen gas, an additional 149 parts of the butene-butane distillate fraction of the composition indicated in Table 1 was fed into the reactor at an elevated pressure.

This reaction mixture was heated at 60° C., and into which a solution of 30 parts of ethylene glycol monophthalate in 74.2 parts of 50% aqueous hydrogen peroxide solution was added at a constant rate for approximately an hour, at an elevated pressure and with stirring. In the meantime, the reaction temperature was maintained at 60° C. by external heating or cooling. The pressure gauge at that time indicated approximately 6 kg./cm.². After the addition of hydrogen peroxide solution was completed, the system was further stirred at 60° C. for 4 hours. Then the valve on the upper part of reflux condenser was opened to drop the pressure to atmospheric level, and the system was heated to 100–105° C. to decompose the unreacted hydrogen peroxide. The resulting product hereafter will be referred to as the reaction mixture II.

The reaction mixtures I and II were combined and charged in a reactor of stainless steel (SUS 32) equipped with a stirrer, reflux condenser, inert gas inlet pipe and a heating jacket, and gradually heated to 150° C. with stirring, to effect the removal of water and unreacted hydrogen peroxide. Then the system was reacted at 200° C. in gaseous nitrogen current until the acid value reached 37. The reaction mixture was cooled to 100° C. To 65 parts of the unsaturated polyester, 0.01 part of hydroquinone and 35 parts of styrene were added to form an unsaturated polyester resin.

The viscosity and gelling time of this resin were measured by the same methods as described in Example 1, with the results of K–L and 16 minutes, respectively.

We claim:

1. A process for the preparation of an unsaturated polyester resin, which comprises adding an aqueous solution of 3–60 weight percent hydrogen peroxide to a mixture of an organic compound containing an unsaturated radical which can be epoxidized with an organic peracid, with a dicarboxylic anhydride, at a temperature of from 10 to 120° C., in the presence of a partially esterified polycarboxylic compound containing at least one unreacted hydroxyl group per molecule, to effect the epoxidation reaction, said organic compound containing an unsaturated radical being selected from the group consisting of monoethylenically unsaturated hydrocarbons, monoethylenically unsaturated halogenated hydrocarbons, ethylenically unsaturated dicarboxylic acids, selected from the group consisting of 3,6-endomethylenetetrahydrophthalic acid and tetrahydrophthalic acid and esters of said ethylenically unsaturated dicarboxylic acids, heating the reaction mixture to 150 to 250° C. in an inert gaseous current to effect the polyesterification thereof, and thereafter mixing the resulting unsaturated polyester with a vinyl monomer which is copolymerizable with said polyester.

2. The process of claim 1 wherein the polyesterification reaction is carried out in the presence of a partially esterified polycarboxylic compound containing at least one unreacted hydroxyl group per molecule.

3. A process for the preparation of an unsaturated polyester resin, which comprises adding an aqueous solution of 3–60 weight percent hydrogen peroxide to a mixture of a distillate fraction containing butane and butene, which is obtained by pyrolysis or dehydrogenation of hydrocarbons, with a dicarboxylic anhydride at a temperature of from 10 to 120° C., in the presence of a partially esterified polycarboxylic compound containing at least one unreacted hydroxyl group per molecule, to effect the expoxidation reaction, heating the reduction mixture to 150 to 250° C., in an inert gaseous current to effect polyesterification thereof, and thereafter mixing the resulting unsaturated polyester with a vinyl monomer which is copolymerizable with said polyester.

4. The process of claim 3 wherein the polyesterification reaction is carried out in the presence of a partially esterified polycarboxylic compound containing at least one unreacted hydroxyl group per molecule.

References Cited

UNITED STATES PATENTS

| | | | |
|---|---|---|---|
| 2,779,783 | 1/1957 | Hayes | 260—485 |
| 2,822,350 | 2/1958 | Hayes | 260—78.4 |
| 2,966,479 | 12/1960 | Fischer | 260—78.4 |
| 3,213,067 | 10/1965 | Pohl et al. | 260—78.4 |
| 3,254,060 | 5/1966 | Connolly et al. | 260—78.4 |
| 3,374,208 | 3/1968 | Seiner et al. | 260—78.4 |
| 3,506,621 | 4/1970 | Fukushima et al. | 260—75 |

OTHER REFERENCES

Malinovskii et al.: "Jouranl of Organic Chemistry of the U.S.S.R.," 4, 1822–1825 (1968).

WILLIAM H. SHORT, Primary Examiner

E. A. NIELSEN, Assistant Examiner

U.S. Cl. X.R.

260—75 EP, 78.4 EP

UNITED STATES PATENT OFFICE
CERTIFICATE OF CORRECTION

Patent No. 3,647,904 Dated March 7, 1972

Inventor(s) IMAI ET AL

It is certified that error appears in the above-identified patent and that said Letters Patent are hereby corrected as shown below:

Column 1, in the heading amend the Serial number to read as follows -- Ser. No. 855,415 --.

Signed and sealed this 27th day of June 1972.

(SEAL)
Attest:

EDWARD M.FLETCHER,JR.
Attesting Officer

ROBERT GOTTSCHALK
Commissioner of Patents